April 9, 1957    L. D. SHORE    2,788,151
ELECTRICAL CONDUIT BOX LOCATOR
Filed Jan. 11, 1956
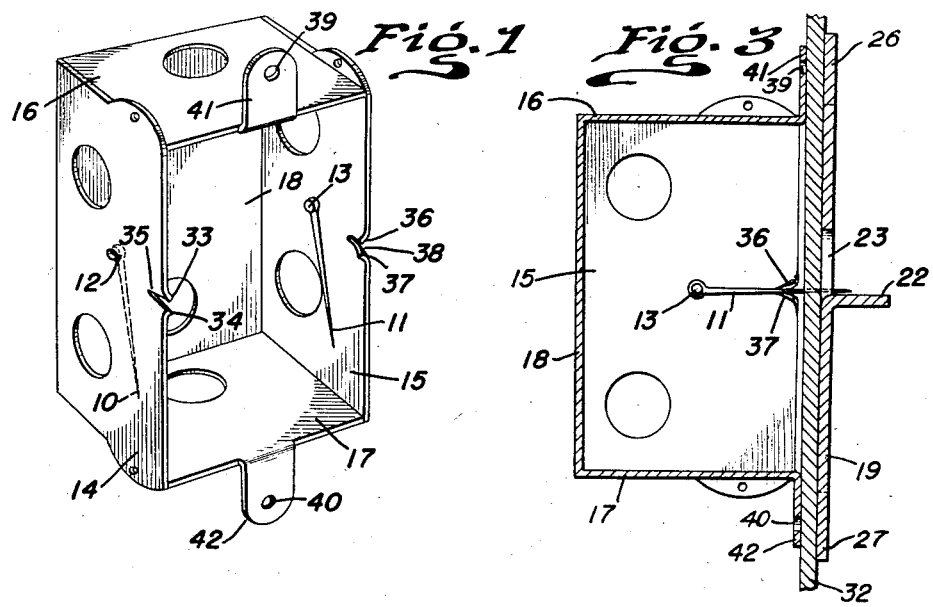
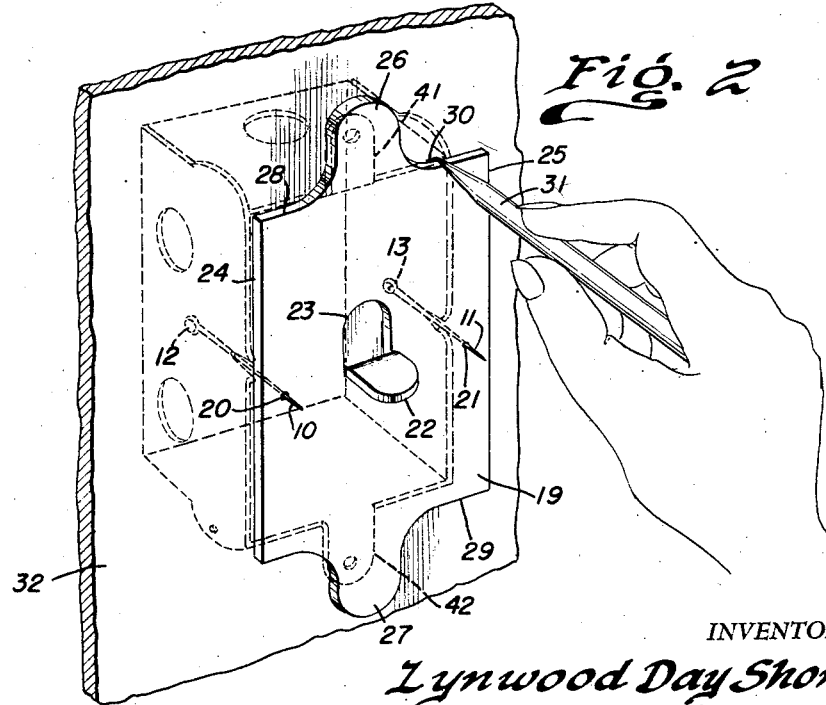
INVENTOR.
Lynwood Day Shore
BY Victor J. Evans & Co.
ATTORNEYS

United States Patent Office 2,788,151
Patented Apr. 9, 1957

2,788,151

ELECTRICAL CONDUIT BOX LOCATOR

Lynwood Day Shore, Beaufort, N. C.

Application January 11, 1956, Serial No. 558,519

8 Claims. (Cl. 220—3.4)

This invention relates to electrical conduit or outlet boxes installed in walls, and in particular, means for locating an opening for a box where the box is hidden by wallboard, sheet rock, or the like, wherein the box is provided with points that are adapted to extend through the wall surfacing material and that are adapted to mesh with openings in a template slightly larger than the box whereby with the template positioned by the points a line described around the outer edge defines an opening to correspond with the box.

The purpose of this invention is to facilitate positioning openings in wall surfacing materials whereby in permanently installing wall surfacing materials, openings therein register with outlet boxes supported in the structure of the wall.

In constructing conventional walls, electricians locate electrical conduit and outlet boxes between studding and other supporting materials, and such boxes are supported by conduits and other electrical conducting elements and as wall surfacing materials are applied to the wall it is necessary to cut openings therein to correspond with the boxes. In numerous instances, attempts are made to locate the openings by measure and owing to different thicknesses of materials and the possibility of error in making measurements such openings do not exactly correspond with the boxes. With this thought in mind, this invention contemplates extending points from the boxes and pressing the wall surfacing materials against the boxes in such a manner that the points penetrate the wall surfacing materials with extended ends of the points projecting from the surface of the wall. With the points extending from the surface of the wall, a template, with openings properly positioned therein, is placed against the wall with the points extended through said openings and with the template held by a handle struck therefrom with one hand the outline of the template may be scribed on a wall with a pencil or the like.

The object of this invention is, therefore, to provide means for locating an electrical outlet or conduit box covered with wallboard or the like to determine the position of an opening to be cut through the wall surfacing material so that the opening registers with the box.

Another object of the invention is to provide means for positioning a stencil or template on the outer surface of wall surfacing material whereby the template is in registering relation with an electrical outlet or conduit box positioned behind the wall surfacing material whereby an opening adapted to correspond with the box may be formed in the wall surfacing material without using a scale or other measuring device.

A further object of the invention is to provide means for locating an electrical outlet or conduit box positioned behind wall surfacing material to facilitate cutting an opening for the box through the material in which the locating means is of simple and economical construction.

With these and other objects and advantages in view, the invention embodies a pair of points pivotally mounted in an electrical conduit or outlet box with projections positioned to retain the points in outwardly extended positions and a template having openings positioned to correspond with the points with the template positioned in registering relation with the box.

Other features and advantages of the invention will appear from the following description, taken in connection with the drawing, wherein:

Figure 1 is a perspective view showing an electrical outlet or conduit box illustrating the positions of locating points therein and showing friction engaging projections for retaining the points in outwardly extended positions.

Figure 2 is a perspective view showing a template positioned on points extended through a sheet of wall surfacing material and illustrating the method of describing an outline of the box on the outer surface of the wall surfacing material with a pencil or the like.

Figure 3 is a vertical section through an electrical outlet or conduit box, a sheet of wall surfacing material and a stencil or template showing the parts assembled wherein points of the box extend through the sheet of wall surfacing material and also through openings in the template whereby the template is located on the wall surfacing material to correspond with the box.

Referring now to the drawing, wherein like reference characters denote corresponding parts, the improved electrical outlet box of this invention includes points 10 and 11 pivotally mounted with pins 12 and 13, respectively, on side walls 14 and 15 of an outlet box, the box also being provided with end walls 16 and 17 and a back 18, and a template 19 having openings 20 and 21 extended therethrough and positioned to receive the points 10 and 11 with the points extended outwardly, as shown in Figure 3, and also having a tab or handle 22 struck from an opening 23 in the template whereby the template is adapted to be gripped by the thumb and forefinger of one hand so that vertically disposed edges 24 and 25 and tabs 26 and 27 extended from ends 28 and 29 are adapted to be held so that a line 30 may be described with an implement, such as the pencil 31, to indicate the position of the outlet or conduit box on the opposite side of the wall surfacing material, indicated by the numeral 32.

Although it is preferred that the sides of the template 19 be slightly larger than the width and length of the box, it will be understood that the template may be of any suitable size.

With the electrical outlet or conduit box positioned by an electrician in wall structure, a panel of wall surfacing material, as indicated by the numeral 32, is positioned against the box and with the pins 10 and 11 extended outwardly and retained in outwardly extended positions by projections 33 and 34 at the sides of a slit 35 in the wall 14 and 36 and 37 at the sides of a slit 38 in the wall 15 the wall surfacing material is pressed over the points whereby the points are forced through the panel and extend from the panel as shown in Figures 2 and 3.

The openings 20 and 21 of the template 19 are positioned to receive the points 10 and 11 and with the template carried by the points and retained in position by the tab 22 an outline is described with an implement, such as the pencil 31, so that the opening for the outlet box may be accurately positioned.

After describing the outline of the template on the wall surface, the template may be removed, the wall surfacing panel cut on the line 30 and with the material removed from the opening the entire box is exposed to the opening. After the opening is cut through the wall surfacing panel the points 10 and 11 are dropped downwardly to positions shown in Figure 1 the outlet is inserted and a face plate or the like is secured to the outlet.

The face plate, which is of conventional design, is secured in position upon the open face of the box with screws or other fasteners extended through the face plate and threaded into the outlet, and the outlet is secured by screws threaded into openings 39 and 40 in conventional tabs 41 and 42, respectively, on upper and lower ends of the box.

It will be understood that modifications, within the scope of the appended claims, may be made in the design and arrangement of the parts without departing from the spirit of the invention.

What is claimed is:

1. An electrical conduit box having side and end walls and a back with openings through the walls and back, points pivotally mounted on the inside face of the side walls and positioned to extend through an open front of the box, and a template having openings therein adapted to be positioned against the surface of a wall surfacing panel so that the periphery of the template corresponds with the outer edge of the box and with the pins extended through the wall surfacing panel and received by the openings in said template to retain the template in fixed relation to the box.

2. An electrical conduit box having side and end walls and a back with openings through the walls and back, points pivotally mounted on the inside face of the side walls and positioned to extend through an open front of the box, and a template of substantially the same pattern as that of the box having openings therethrough positioned to receive the points of the box and adapted to be positioned by said points on the outer surface of a wall surfacing panel so that the periphery of said plate corresponds with the outer edge of said box to provide means for describing an outline of the box on the outer surface of the panel.

3. In an electrical outlet or conduit box locator, the combination which comprises a box having side and end walls and a back, points pivotally mounted on the side walls of the box, spaced projections positioned to receive the points and adapted to retain the points in outwardly extended positions, and a template of substantially the same pattern as that of the box and having openings therethrough positioned to receive the points with the periphery of the template substantially corresponding to that of the box.

4. In an electrical outlet or conduit box locator, the combination which comprises a box having side and end walls and a back, points pivotally mounted on the side walls of the box, spaced projections positioned to receive the points and adapted to retain the points in outwardly extended positions, and a template of substantially the same pattern as that of the box and having openings therethrough positioned to receive the points with the periphery of the template substantially corresponding to that of the box, said template having a tab extended from the intermediate part providing a handle for retaining the template in position as the outline thereof is described on the outer surface of a wall surfacing panel.

5. In an electrical outlet or conduit box, the combination which comprises a box having side and end walls and a back with conduit receiving openings in said walls and back and having spaced outlet fastening retaining tabs extended from the end walls thereof, points pivotally mounted on the side walls and adapted to be positioned with pointed ends extended from the front or open side of the box, projections on the edges of the side walls of the box positioned to retain the points in outwardly extended positions, a template having openings therethrough positioned to receive the points of the box, the outline of the template being larger than that of the box and the ends of said template having tabs extended therefrom corresponding with tabs of the box.

6. In an electrical outlet or conduit box, the combination which comprises a box having side and end walls and a back with conduit receiving openings in said walls and back and having spaced outlet fastener retaining tabs extended from the end walls thereof, points pivotally mounted on the side walls and adapted to be positioned with pointed ends extended from the front or open side of the box, projections on the edges of the side walls of the box positioned to retain the points in outwardly extended positions, a template having openings therethrough positioned to receive the points of the box, the outline of the template being larger than that of the box and the ends of said template having tabs extended therefrom corresponding with tabs of the box, said template having a tab struck therefrom and extended outwardly providing a handle.

7. In an electrical outlet or conduit box locator, the combination which comprises a box having side and end walls and a back, points pivotally mounted on the side walls of the box, means for retaining the points in outwardly extended positions, and a template of substantially the same pattern as that of the box and having openings therethrough positioned to receive the points with the periphery of the template substantially corresponding to that of the box.

8. In an electrical outlet or conduit box locator, the combination which comprises a box having side and end walls and a back, points pivotally mounted on the side walls of the box, means for retaining the points in outwardly extended positions, and a template of substantially the same pattern as that of the box and having openings therethrough positioned to receive the points with the periphery of the template substantially corresponding to that of the box, said template having a tab extended from the intermediate part providing a handle for retaining the template in position as the outline thereof is described on the outer surface of a wall surfacing panel.

References Cited in the file of this patent

UNITED STATES PATENTS

| | | |
|---|---|---|
| 1,392,360 | Searle | Oct. 4, 1921 |
| 2,666,546 | Reilly | Jan. 19, 1954 |